(12) United States Patent
Toda et al.

(10) Patent No.: US 8,584,711 B2
(45) Date of Patent: Nov. 19, 2013

(54) OUTER TUBE FOR FRONT FORK

(75) Inventors: Tomoya Toda, Fukuroi (JP); Makoto Hayashi, Kyoto (JP); Masao Hirukawa, Kyoto (JP)

(73) Assignee: Showa Corporation (JP)

( * ) Notice: Subject to any disclaimer, the term of this patent is extended or adjusted under 35 U.S.C. 154(b) by 701 days.

(21) Appl. No.: 12/335,669

(22) Filed: Dec. 16, 2008

(65) Prior Publication Data

US 2009/0189367 A1 Jul. 30, 2009

(30) Foreign Application Priority Data

Jan. 30, 2008 (JP) .................................. 2008-019839

(51) Int. Cl.
*F16L 9/14* (2006.01)

(52) U.S. Cl.
USPC ........... 138/153; 138/125; 280/279; 280/288; 280/284

(58) Field of Classification Search
USPC ............ 138/125, 153, 31; 280/279, 288, 284, 280/124, 133
See application file for complete search history.

(56) References Cited

U.S. PATENT DOCUMENTS

| | | | | | |
|---|---|---|---|---|---|
| 3,457,962 | A | * | 7/1969 | Shobert | 138/144 |
| 3,850,203 | A | * | 11/1974 | Shobert | 138/125 |
| 4,385,952 | A | * | 5/1983 | Futakuchi et al. | 156/174 |
| 4,828,285 | A | * | 5/1989 | Foret et al. | 280/279 |
| 5,549,947 | A | * | 8/1996 | Quigley et al. | 428/36.2 |
| 5,557,982 | A | * | 9/1996 | Voss et al. | 74/551.1 |
| 5,609,349 | A | * | 3/1997 | Buckmiller et al. | 280/280 |
| 5,944,932 | A | * | 8/1999 | Klein et al. | 156/245 |
| 5,985,073 | A | * | 11/1999 | Kimura et al. | 156/188 |
| 6,270,426 | B1 | * | 8/2001 | Matsumoto | 473/319 |
| 6,655,707 | B2 | * | 12/2003 | Buckmiller et al. | 280/279 |
| 7,438,712 | B2 | * | 10/2008 | Chouinard | 604/527 |
| 2005/0151344 | A1 | * | 7/2005 | Parkin | 280/284 |
| 2007/0257466 | A1 | * | 11/2007 | Murphy et al. | 280/276 |
| 2008/0277047 | A1 | * | 11/2008 | Kubota et al. | 156/148 |
| 2009/0189367 | A1 | * | 7/2009 | Toda et al. | 280/279 |

FOREIGN PATENT DOCUMENTS

| | | |
|---|---|---|
| JP | 2000-18303 | 1/2000 |
| JP | 2006-347386 | 12/2006 |

* cited by examiner

*Primary Examiner* — James Hook
(74) *Attorney, Agent, or Firm* — Babcock IP, PLLC

(57) ABSTRACT

An outer tube for a front fork having an FRP pipe body which is subjected to braiding processing using a braider, wherein the FRP pipe comprises a combination of braids interlacing with each other at an interlacing angle ±θ° with respect to a center axis of the pipe and warp fibers having an angle 0° with respect to the pipe center axis, rigidity of the plurality of warp fibers disposed at positions in a circumferential direction of the pipe is varied depending upon the positions in the circumferential direction of the pipe, and bending rigidity of the FRP pipe in the longitudinal direction is varied in the circumferential direction of the pipe.

8 Claims, 6 Drawing Sheets

OUTER TUBE FOR FRONT FORK

BACKGROUND OF THE INVENTION

1. Field of the Invention

The present invention relates to an outer tube for a front fork using a fiber reinforced plastics (FRP) pipe.

2. Description of the Related Art

In an inverted type front fork of a two-wheeled motor vehicle, an inner tube on the side of an axle is slidably inserted into an outer tube on the side of a vehicle body, and since a diameter of the outer tube is greater than that of the inner tube, rigidity of the outer tube is greater than that of the inner tube.

According to an outer tube described in Japanese Patent Application Laid-open No. 2000-18303 (patent document 1), bending rigidity of a lower portion of a vehicle body mounting portion in the longitudinal direction of the vehicle body is increased so that the outer tube is less prone to be deformed, and bending rigidity in the lateral direction of the vehicle body is reduced so that the outer tube is prone to be deformed. With this structure, tightness feeling with respect to a load in the longitudinal direction of the vehicle body applied to a front fork at the time of braking is secured, and shock absorbing performance with respect to a load in a widthwise direction of the vehicle applied to the front fork at the time of cornering is enhanced.

According to an outer tube described in Japanese Patent Application Laid-open No. 2006-347386 (patent document 2), bending rigidity of a lower portion of a vehicle body mounting portion at a position at 45° from the longitudinal direction of a vehicle body is increased so that tightness feeling with respect to a load in the longitudinal direction of the vehicle body applied to a front fork at the time of braking is secured, and shock absorbing performance with respect to a load in a widthwise direction of the vehicle applied to the front fork at the time of cornering is enhanced.

In the outer tube for the front fork described in the patent document 1, an outer peripheral surface is cut so that the bending rigidity in the lateral direction of the vehicle body is reduced. The addition of this feature is complicated.

In the outer tube for the front fork described in the patent document 2, another member is adhered to an outer peripheral surface of the outer tube, thereby increasing the bending rigidity at a position at 45° from the longitudinal direction of the vehicle body. The addition of this feature is also complicated.

When the outer tube is comprises an FRP pipe, the number of laminated resin-impregnated fiber sheets (prepreg sheets) of the FRP material is adjusted in a circumferential direction of the pipe, and a thickness of the FRP pipe is varied in the circumferential direction of the pipe, the bending rigidity of the outer tube in the longitudinal extent of the vehicle body and the lateral extent of the vehicle body. However, it is complicated to adjust the number of laminated prepreg sheets of the FRP material in the circumferential direction of the pipe, which increases cost.

SUMMARY OF THE INVENTION

In an outer tube for a front fork using an FRP pipe, it is an object of the present invention to easily vary the bending rigidity in a longitudinal extent of the outer tube in a circumferential extent of the pipe.

The present invention relates to an outer tube for a front fork having an FRP pipe body that is subjected to braiding processing using a braider. The FRP pipe comprises a combination of braids interlacing with each other at an interlacing angle ±θ° with respect to a center axis of the pipe and warp fibers having an angle of 0° with respect to the pipe center axis, rigidity of the plurality of warp fibers disposed at positions in a circumferential extent of the pipe is varied depending upon the positions in the circumferential extent of the pipe, and thus bending rigidity of the FRP pipe in the longitudinal extent is varied in the circumferential extent of the pipe.

The present invention relates to an inverted type front fork in which an axle-side inner tube is slidably inserted into a vehicle body-side outer tube. The outer tube has an FRP pipe body that is subjected to braiding processing using a braider. The FRP pipe comprises a combination of braids interlacing with each other at an interlacing angle ±θ° with respect to a center axis of the pipe and a plurality of warp fibers having an angle 0° with respect to the pipe center axis, rigidity of the warp fibers is varied depending upon the positions in the circumferential extent of the pipe, and bending rigidity of the FRP pipe in the longitudinal direction is varied depending upon the circumferential extent of the pipe.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 1A and 1B show a front fork, wherein

FIGS. 5A and 5B show the outer tube, wherein FIGS. 6A to 6C show the braided cord body of the FRP pipe, wherein

DESCRIPTION OF THE PREFERRED EMBODIMENTS

Figure 1A:
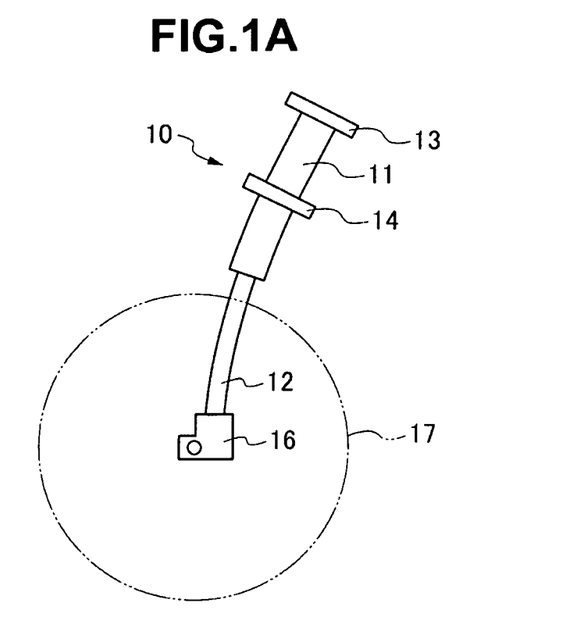
FIG. 1A is a schematic side view and FIG. 1B is a schematic front view.
Figure 1B:
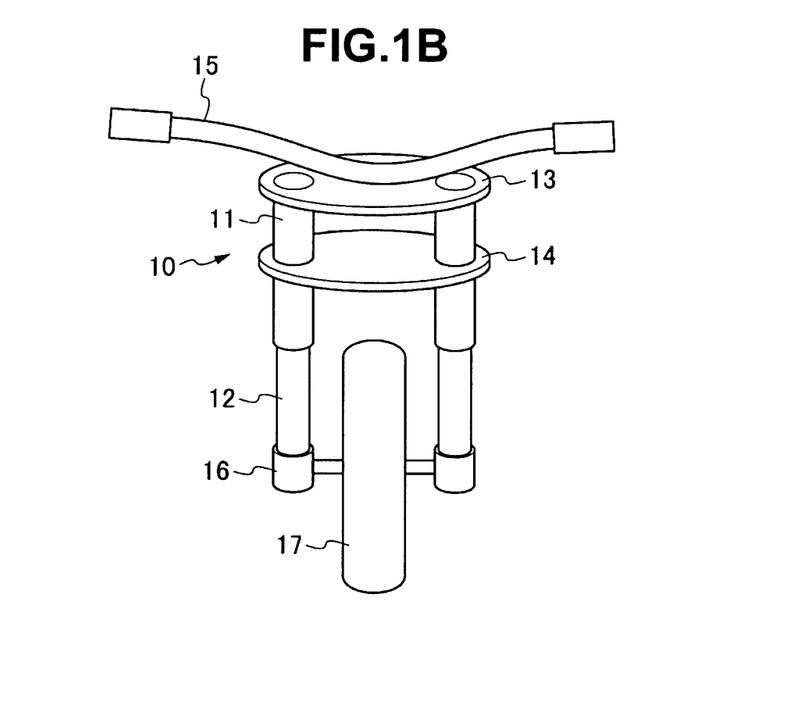

FIGS. 1A and 1B show an inverted type front fork 10. An axle-side inner tube 12 is slidably inserted into a vehicle body-side outer tube 11, and a damping mechanism is embedded. Left and right outer tubes 11 are connected to a vehicle body mounting upper bracket 13 and a vehicle body mounting lower bracket 14. A handle rotation shaft (not shown) connects the vehicle body mounting upper bracket 13 and the vehicle body mounting lower bracket 14 with each other. The handle rotation shaft is pivotally supported by a head pipe of a vehicle body frame. A handle bar 15 is fixed to the vehicle body mounting upper bracket 13. Axle brackets 16 are provided on lower ends of the left and right inner tubes 12. An axle of a wheel 17 is pivotally supported by the axle brackets 16.

Figure 2:
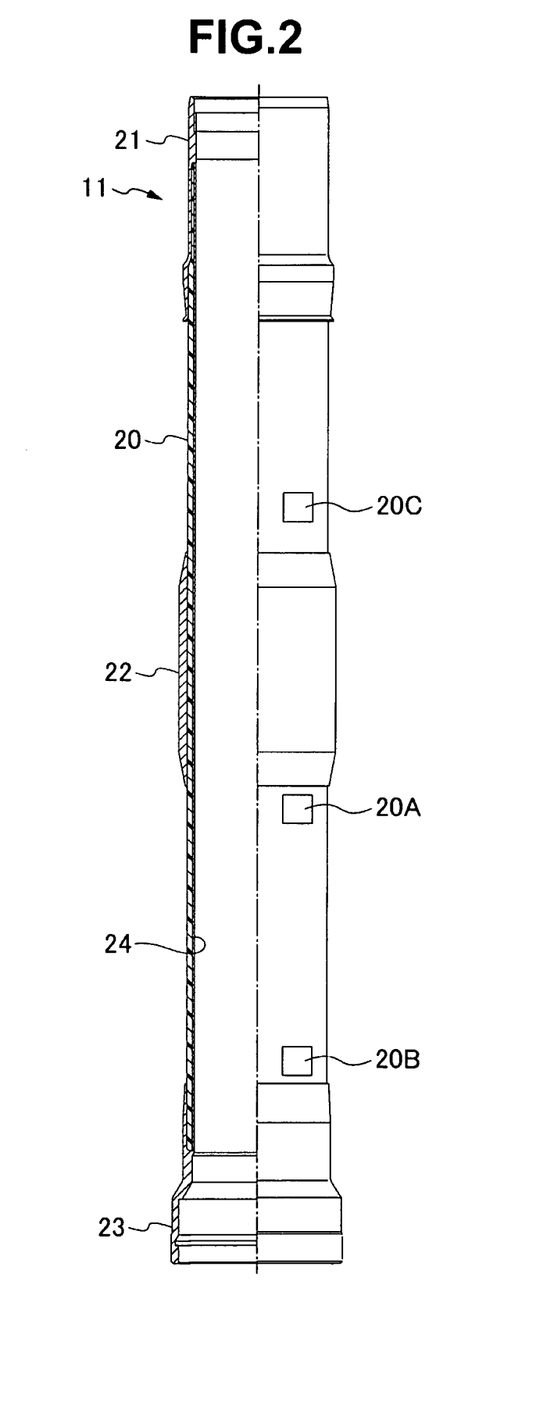
FIG. 2 is a sectional view showing an outer tube.

As shown in FIG. 2, the outer tube 11 has an FRP pipe body 20, an upper collar 21 is fitted to an upper end of the body 20, the vehicle body mounting upper bracket 13 is coupled to the upper collar 21, a lower collar 22 is fitted to an intermediate portion of the body 20, the vehicle body mounting lower bracket 14 is coupled to the lower collar 22, and a seal case 23 is fitted to a lower end of the body 20. The inner tube 12 is inserted into and supported by the seal case 23. The upper collar 21, the lower collar 22 and the seal case 23 may be, for example, constituted by metal such as aluminum alloy. A metal thin tube 24 made of aluminum alloy, iron, or the like, is fitted to an inner periphery of the body 20 to secure roundness of the body 20 and to enhance the sliding performance of the inner tube 12. In this invention, it is not absolutely necessary to have the metal thin tube 24. The metal thin tube 24 fitted to the body 20 is fitted to the inner peripheral steps of the upper and lower collars 21 and 22 and is prevented from coming out.

The inner tube 12 can be constituted by an FRP pipe or a metal pipe made of aluminum alloy, iron, or the like.

A structure of the outer tube 11 will be described in detail.

To secure tightness feeling with respect to a load in the longitudinal direction of the vehicle body applied to a front fork at the time of braking, and to enhance the shock absorbing performance with respect to a load in a widthwise direction of the vehicle applied to the front fork at the time of cornering is enhanced, it is necessary that bending rigidity of a lower portion of the vehicle body mounting portion supported by the vehicle body mounting upper bracket 13 (upper collar 21) and the vehicle body mounting lower bracket 14 (lower collar 22) in the longitudinal direction of the vehicle body is increased so that that the outer tube 11 becomes less prone to deformation, and bending rigidity in the lateral direction of the vehicle body is reduced so that it is prone to deformation (or it is necessary that bending rigidity at a position, for example, at an angle 45° from the longitudinal direction of the vehicle body is increased). Therefore, in order to easily vary the longitudinal bending rigidity in the circumferential direction of the FRP pipe body 20, the body 20 is constituted as follows.

The FRP pipe 30 constituting the FRP pipe body 20 of the outer tube 11 comprises, for example, an FRP braiding braided cord body 30A which is braided (braided cord) using a braider, for example as described in Japanese Patent No. 3760994. A producing method of the FRP pipe 30 includes a braiding step for pre-setting a resin-impregnated thread (reinforced fiber) to a braider and weaving the braided cord body 30 by braiding, and a wrapping step for continuously wrapping a heat-shrinkable tape around the braided cord body 30A.

Figure 3:
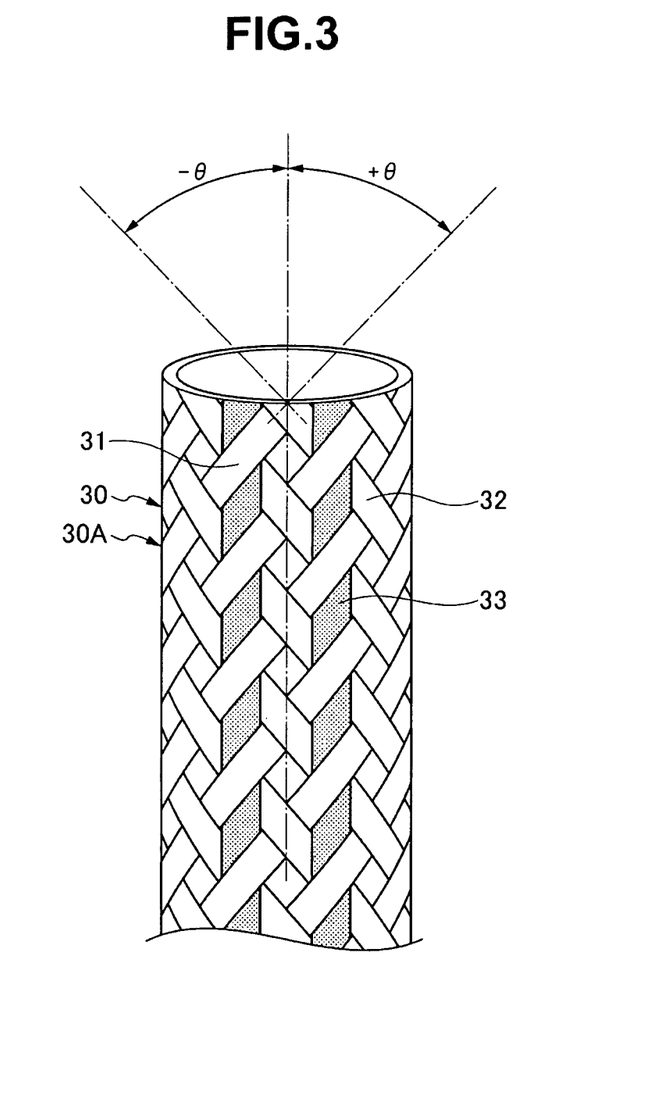
FIG. 3 is a schematic perspective view showing a braided cord body of an FRP pipe.
Figure 4:
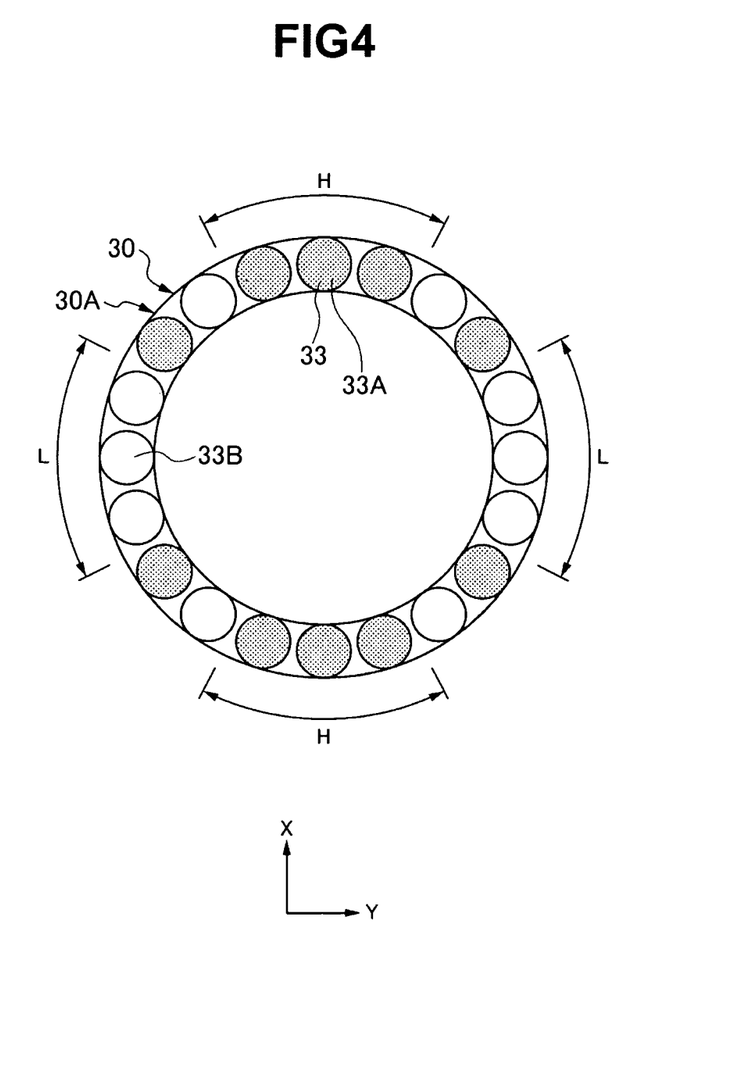
FIG. 4 is a schematic end view showing layout of warp fibers of the braided cord body of the FRP pipe.

(1) Braiding Steps (FIGS. 3 and 4)

In order to weave the FRP braiding braided cord body 30A which becomes the FRP pipe 30 with the braider, as shown in FIG. 3, braids 31 and 32 which are interlaced with each other at the interlacing angle ±θ° with respect to the pipe center axis, and a warp fiber 33 having an angle 0° with respect to the pipe center axis are combined around a mandrel. This processing is called braiding processing. With this braiding processing, one braided layer is constituted. The braided cord body 30A comprises at least one braided layer, and usually, a plurality of braided layers are laminated and composed.

Figure 5A:
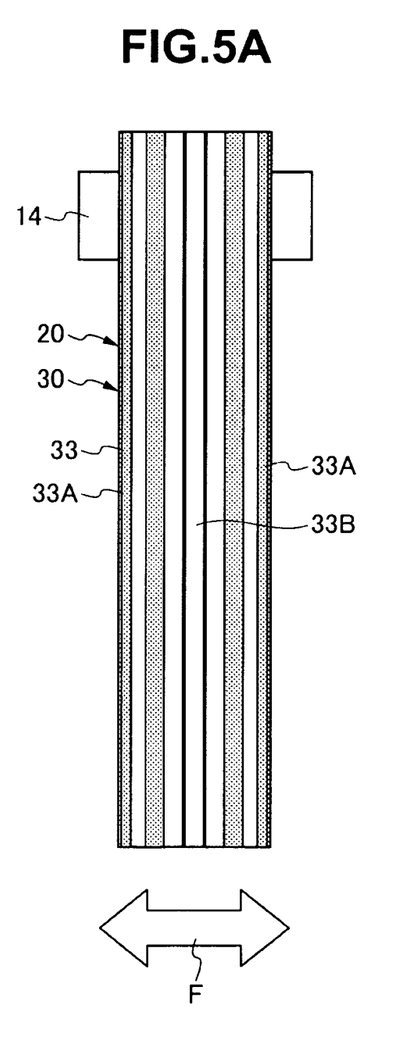
FIG. 5A is a schematic side view and FIG. 5B is a schematic front view.
Figure 5B:
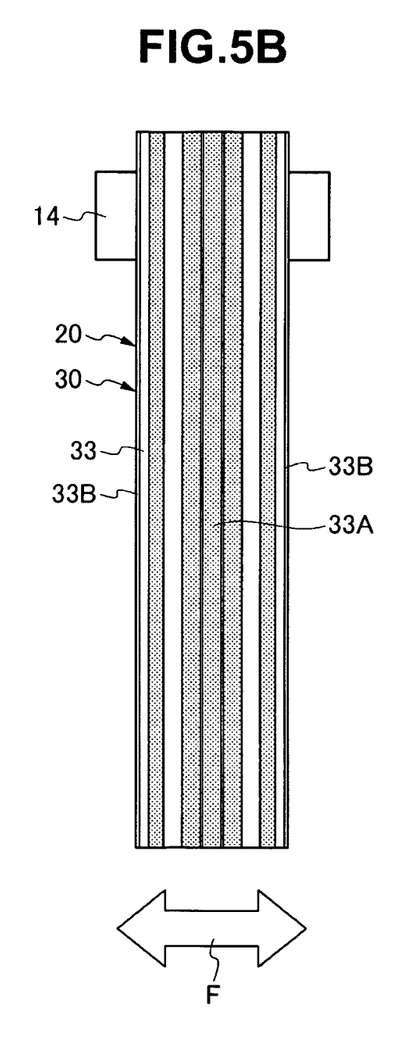
Figure 6A:
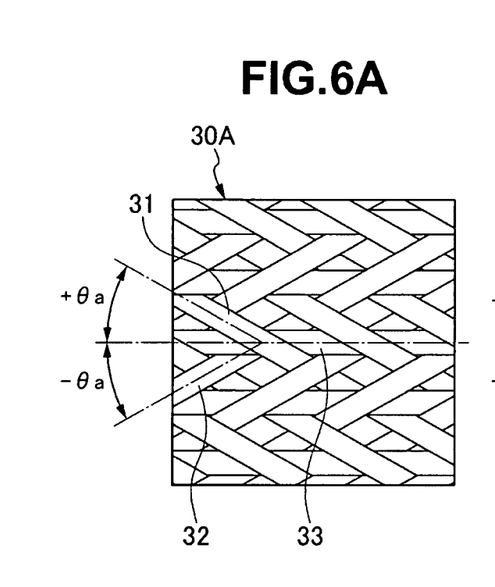
FIG. 6A is a schematic plan view of a high rigidity body.

At the time of the braiding processing carried out around the mandrel, as shown in FIG. 4, with respect to the FRP braiding braided cord body 30A of the present embodiment, rigidity of each of the plurality of warp fibers 33 disposed at respective positions in the circumferential direction of the pipe is varied depending upon the position of the circumferential direction of the pipe. In the braided cord body 30A shown in FIG. 4, high rigidity warp fibers 33A are intensively disposed in high rigidity ranges H extending over a certain angle ranges on both sides of the braided cord body 30A including a diameter located in the X direction of the pipe cross section, low rigidity warp fibers 33B are intensively disposed in low rigidity ranges L extending over a certain angle ranges on both sides of the braided cord body 30A including a diameter located in the Y direction of the pipe cross section intersecting with the X direction, the high rigidity warp fibers 33A (high rigidity warp fibers 33A which are adjacent to the low rigidity warp fibers 33B in the low rigidity ranges L) and the low rigidity warp fibers 33B (low rigidity warp fibers 33B which are adjacent to the high rigidity warp fibers 33A in the high rigidity ranges H) extending over the certain angle ranges on both sides including the diameter diagonally intersecting with the X direction and Y direction sandwiched between the high rigidity ranges H and the low rigidity ranges L at 45° for example are mixed and disposed to intermediate ranges. Bending rigidity of the FRP pipe body 20 (FRP pipe 30) in the longitudinal direction which is supported by the braided cord body 30A, the vehicle body mounting upper bracket 13 and the vehicle body mounting lower bracket 14 exhibits a high rigidity characteristic with respect to a lateral force F applied in a plane including the high rigidity range H in the circumferential direction of the pipe at a lower portion of the vehicle body mounting lower bracket 14 as shown in FIG. 6A, and exhibits a low rigidity characteristic with respect to the lateral force F applied in a plane including the low rigidity portion L in the circumferential direction of the pipe at a lower portion of the vehicle body mounting lower bracket 14 as shown in FIG. 5B. With this, the bending rigidity of the braided cord body 30A in the longitudinal direction is varied in the circumferential direction of the pipe. At that time, the bending rigidity of the braided cord body 30A in the longitudinal direction with respect to the lateral force applied in the plane including the intermediate rigid range sandwiched between the high rigidity range H and the low rigidity range L is about medium, and variation of the longitudinal direction bending rigidity of the braided cord body 30A in the circumferential direction of the pipe becomes gentle.

Threads of the braids 31 and 32 and the warp fiber 33 constituting the FRP pipe 30 (braided cord body 30A) are resin-impregnated threads. The kinds of the threads that may be applied are not limited. For example, carbon fiber (CF), glass fiber (GF), aramid fiber (AF), other high polymer fiber, metal thread and the like may be used. Resins are not limited to epoxy-based resin, imide-based resin and others, thermoplastic resin, and thermosetting resin, and any resin can be used.

(2) Wrapping Steps

By carrying out the above-described (1), the braided cord body 30A is woven and in this state, the heat-shrinkable tape is continuously wound around the braided cord body 30A, thereby obtaining the FRP pipe 30. With this wrapping, resin is appropriately blown, appropriate resin content can be obtained and with this, mechanical characteristics of the material itself are enhanced.

(3) Producing Steps of Outer Tube

The above-described (2) FRP pipe 30 is defined as the FRP pipe body 20. The upper collar 21, the lower collar 22, the seal case 23 and the metal thin tube 24 are assembled to the body 20 and this is defined as the outer tube 11.

According to the FRP pipe body 20 (FRP pipe 30) constituting the outer tube 11, the high rigidity range H of the braided cord body 30A is disposed in a direction along the longitudinal direction of the vehicle body, and the low rigidity range L of the braided cord body 30A is disposed in a direction along the widthwise direction of the vehicle (in the FRP pipe body 20 (FRP pipe 30), it is conceived that the high rigidity range H of the braided cord body 30A is disposed at a diagonal position at 45° from the longitudinal direction of the vehicle body for example). With this, the bending rigidity in the longitudinal direction of the vehicle body is increased so that the outer tube can easily be deformed, and the bending rigidity in the lateral direction of the vehicle body is reduced so that the outer tube can easily be deformed. With this structure, tightness feeling with respect to a load in the longitudinal direction of the vehicle body applied to a front fork at the time of braking can be secured, and shock absorbing performance with respect to a load in a widthwise direction of the vehicle applied to the front fork at the time of cornering can be enhanced.

According to the present embodiment, the following effects can be exhibited.

(a) The FRP pipe 30 constituting the outer tube 11 for the front fork comprises a combination of braids 31 and 32 which interlace with each other with the interlacing angle ±θ° with respect to the pipe center axis, and the warp fiber 33 having the angle 0° with respect to the pipe center axis, the rigidity of each of the plurality of warp fibers 33 disposed at positions in the circumferential direction of the pipe is varied depending upon the position of the circumferential direction of the pipe, and the bending rigidity of the FRP pipe 30 in the longitudinal direction is varied arbitrarily in the circumferential direction of the pipe. The bending rigidity of the outer tube 11 in the longitudinal direction can be cost effectively varied in the circumferential direction of the pipe by varying the rigidity of each warp fiber 33 constituting the FRP pipe 30 depending upon the respective position of the warp fiber 33 in the circumferential direction of the pipe.

(b) In the inverted type front fork 10, the outer tube 11 of the above-described (a) can be used. With this, the bending rigidity of the front fork 10 in the longitudinal direction of the vehicle body can be enhanced, the bending rigidity in the widthwise direction of the vehicle is lowered and tightness feeling with respect to a load in the longitudinal direction of the vehicle body applied to a front fork 10 at the time of braking can be secured, and shock absorbing performance with respect to a load in a widthwise direction of the vehicle applied to the front fork 10 at the time of cornering can be enhanced.

The outer tube 11 can further include the following structure.

It is necessary that rigidity of the outer tube 11 near the vehicle body mounting portion supported by the vehicle body mounting lower bracket 14 (lower collar 22) is high, rigidity of the lower end (free end) into which the inner tube 12 is inserted and supported is low because the following capability of the front fork 10 with respect to the variation in road surface during running is enhanced so that the lower portion can easily bow. Therefore, the following structure can be employed for the FRP pipe body 20 for easily varying the bending rigidity in the longitudinal direction of the outer tube 11 in the longitudinal position.

Figure 6B:
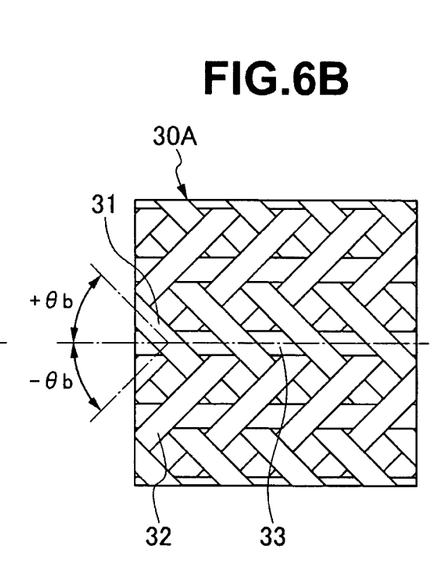
FIG. 6B is a schematic plan view of an intermediate rigid body.
Figure 6C:
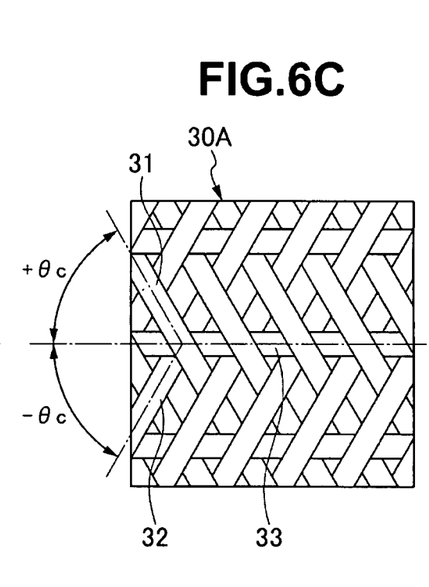
FIG. 6C is a schematic plan view of a low rigidity body.

That is, in the braided cord body 30A of the present embodiment, a value of the interlacing angle ±θ° of the braids 31 and 32 during the braiding processing period of the above-described (1) around a mandrel is continuously varied to any of θa, θb, and θc shown in FIGS. 6A, 6B and 6C along the longitudinal direction of the braided cord body 30A. The bending rigidity of the braided cord body 30A woven in the longitudinal direction with θa in FIG. 6A is high, the bending rigidity of the braided cord body 30A woven in the longitudinal direction with θb in FIG. 6B is medium, and the bending rigidity of the braided cord body 30A woven in the longitudinal direction with θc in FIG. 6C is low. By continuously varying the interlacing angle ±θ° of the braids 31 and 32 constituting the braided cord body 30A along the longitudinal direction of the braided cord body 30A, the bending rigidity in the longitudinal direction of the braided cord body 30A and of the FRP pipe 30 can arbitrarily be varied in the longitudinal extent.

In the producing steps of the outer tube in the above-described (3), as shown in FIG. 2, the braided cord body 30A constituting a vehicle body mounting portion 20A of the FRP pipe body 20 (FRP pipe 30) constituting the outer tube 11 near the vehicle body mounting portion 20A supported by the vehicle body mounting lower bracket 14 (lower collar 22) comprises the high rigidity body having the interlacing angle of the braids 31 and 32 of θa in FIG. 6A. The braided cord body 30A constituting the lower end (free end) 20B into which the inner tube 12 is inserted and supported comprises a low rigidity body having the interlacing angle of the braids 31 and 32 of θc in FIG. 6C. The braided cord body 30A constituting the intermediate portion 20C is sandwiched and supported between the vehicle body mounting upper bracket 13 (upper collar 21) and the vehicle body mounting lower bracket 14 (lower collar 22) has an appropriate rigidity characteristic suitable for vehicle type, required steering stability, and the like, for example, medium rigidity body having θb in FIG. 6B or low rigidity body having θc in FIG. 6C, the interlacing angle of the braids 31 and 32.

According to the present embodiment, the following effects can be exhibited.

(a) The FRP pipe 30 constituting the outer tube 11 for the front fork combines the braids 31 and 32 which interlace with each other with the interlacing angle ±θ° with respect to the pipe center axis, the value of the interlacing angle ±θ° of the braids 31 and 32 during the braiding processing period is varied, and the bending rigidity of the FRP pipe 30 in the longitudinal direction is arbitrarily varied in the longitudinal position. The bending rigidity of the outer tube 11 in the longitudinal direction can be cost effectively varied by the longitudinal position by varying the value of the interlacing angle ±θ° of the braids 31 and 32 during the braiding processing period.

(b) In the inverted type front fork 10, the outer tube 11 of the above-described (a) can be used. With this, the rigidity of the outer tube 11 near the vehicle body mounting portion can be sufficiently increased, the rigidity of the lower end (free end) of the outer tube 11 into which the inner tube 12 is inserted and supported is lowered so that the outer tube 11 can easily bow, and the following capability of the front fork 10 with respect to variation in road surface during running can be enhanced.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. The outer tube of the present invention can be used in such a manner that the high rigidity portion or the low rigidity portion obtained in a specific portion in the circumferential direction of the pipe by the present invention is disposed in a desired direction with respect to the longitudinal direction of the vehicle body. Further, the outer tube of the present invention can be used in such a manner that the high rigidity portion or the low rigidity portion obtained in a specific portion in the longitudinal direction by the present invention is disposed in a desired longitudinal position.

In the embodiment of the present invention, as the warp fibers 33 constituting the FRP pipe, three or more kinds warp fibers of various materials and various rigidity can be employed in addition to the two kinds of warp fibers, i.e., the high rigidity warp 33A and the low rigidity warp 33B.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An outer tube for a front fork having an FRP pipe body which is subjected to braiding processing using a braider:
   wherein the FRP pipe comprises at least one layer of braided cord body combining braids interlacing with each other at an interlacing angle ±θ° with respect to a center axis of the pipe and warp fibers having an angle 0° with respect to the pipe center axis by braiding processing around a mandrel,
   on each braided cord body, rigidity of the plurality of warp fibers disposed at positions in a circumferential direction of the pipe is varied depending upon the positions in the circumferential direction of the pipe, and bending rigidity of the FRP pipe in the longitudinal direction is varied in the circumferential direction of the pipe.

2. The outer tube for the front fork according to claim 1, wherein a value of the interlacing angle ±θ° of the braid of the FRP pipe is varied during a braiding processing period, and the bending rigidity of the FRP pipe in the longitudinal direction is also varied depending upon a longitudinal position.

3. The outer tube for the front fork according to claim 2, wherein
   in a braided cord body of the FRP pipe, high rigidity warps are intensively disposed for forming high rigidity ranges in a certain angle ranges on both sides including a diameter located in an arbitrary X direction of a pipe cross section,
   low rigidity warp fibers are intensively disposed for forming low rigidity ranges in a certain angle ranges on both sides including a diameter located in Y direction intersecting with the X direction of a pipe cross section at right angles, and
   high rigidity warp fibers and low rigidity warp fibers are mixed and disposed for forming intermediate rigid ranges in a certain angle ranges on both sides including a diameter diagonally intersecting with the X direction and Y direction at 45° sandwiched between the high rigidity range and the low rigidity range.

4. The outer tube for the front fork according to claim 1, wherein
   in a braided cord body of the FRP pipe, high rigidity warp fibers are intensively disposed, forming high rigidity ranges in a certain angle ranges on both sides including a diameter located in an arbitrary X direction of a pipe cross section,
   low rigidity warps are intensively disposed, forming low rigidity ranges in a certain angle ranges on both sides including a diameter located in Y direction intersecting with the X direction of a pipe cross section at right angles, and
   high rigidity warps and low rigidity warps are mixed and disposed for forming intermediate rigid ranges in a certain angle ranges on both sides including a diameter diagonally intersecting with the X direction and Y direction at 45° sandwiched between the high rigidity range and the low rigidity range.

5. An inverted type front fork in which an axle-side inner tube is slidably inserted into a vehicle body-side outer tube, comprising:
   an FRP pipe body of the outer tube which is subjected to braiding processing using a braider, and
   the FRP pipe comprises at least one layer of braided cord body combining braids interlacing with each other at an interlacing angle ±θ° with respect to a center axis of the pipe and a plurality of warps having an angle 0° with respect to the pipe center axis by braiding processing around a mandrel,
   on each braided cord body, rigidity of the warp fibers is varied depending upon the positions in the circumferential direction of the pipe, and bending rigidity of the FRP pipe in the longitudinal direction is varied depending upon the circumferential direction of the pipe.

6. The inverted type front fork according to claim 5, wherein a value of the interlacing angle ±θ° of the braid of the FRP pipe varies during a braiding processing period, and the bending rigidity of the FRP pipe in the longitudinal direction is also varied depending upon a longitudinal position.

7. The inverted type front fork according to claim 6, wherein
   in a braided cord body of the FRP pipe, high rigidity warp fibers are intensively disposed for forming high rigidity ranges in a certain angle ranges on both sides including a diameter located in an arbitrary X direction of a pipe cross section,
   low rigidity warp fibers are intensively disposed for forming low rigidity ranges in a certain angle ranges on both sides including a diameter located in Y direction intersecting with the X direction of a pipe cross section at right angles, and
   high rigidity warp fibers and low rigidity warp fibers are mixed and disposed for forming intermediate rigid ranges in a certain angle ranges on both sides including a diameter diagonally intersecting with the X direction and Y direction at 45° sandwiched between the high rigidity range and the low rigidity range.

8. The inverted type front fork according to claim 5, wherein
   in a braided cord body of the FRP pipe, high rigidity warp fibers are intensively disposed for forming high rigidity ranges in a certain angle ranges on both sides including a diameter located in an arbitrary X direction of a pipe cross section,
   low rigidity warp fibers are intensively disposed for forming low rigidity ranges in a certain angle ranges on both sides including a diameter located in Y direction intersecting with the X direction of a pipe cross section at right angles, and
   high rigidity warp fibers and low rigidity warp fibers are mixed and disposed for forming intermediate rigid ranges in a certain angle ranges on both sides including a diameter diagonally intersecting with the X direction and Y direction at 45° sandwiched between the high rigidity range and the low rigidity range.

* * * * *

UNITED STATES PATENT AND TRADEMARK OFFICE
CERTIFICATE OF CORRECTION

PATENT NO. : 8,584,711 B2  Page 1 of 1
APPLICATION NO. : 12/335669
DATED : November 19, 2013
INVENTOR(S) : Tomoya Toda, Makoto Hayashi and Masao Hirukawa It is certified that error appears in the above-identified patent and that said Letters Patent is hereby corrected as shown below:

In the Claims:

Col. 7, Line 20, Claim 1, Line 5

$\pm 8°$

Should be:

$\pm\theta°$

Signed and Sealed this
Eleventh Day of February, 2014

Michelle K. Lee
*Deputy Director of the United States Patent and Trademark Office*